UNITED STATES PATENT OFFICE.

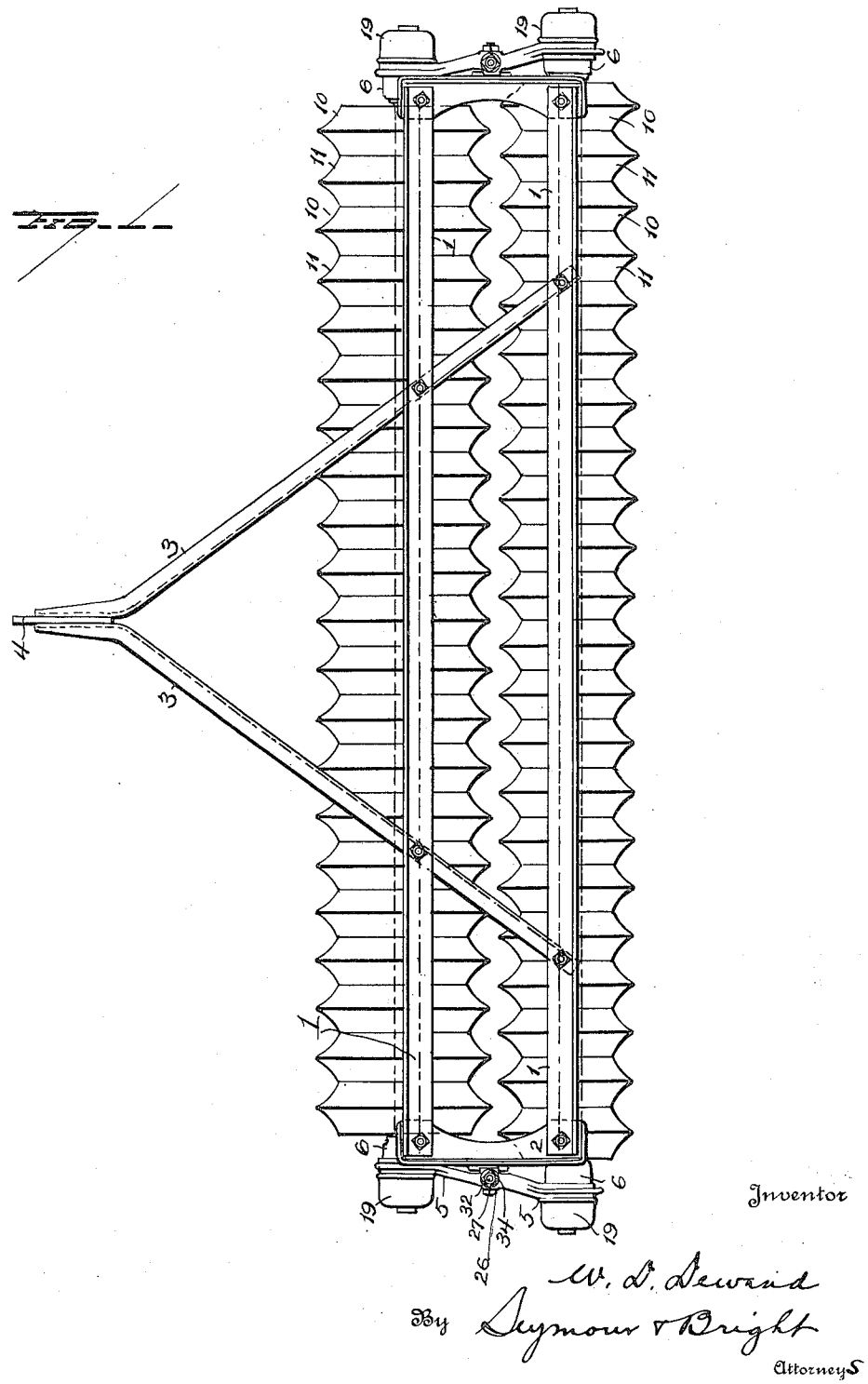

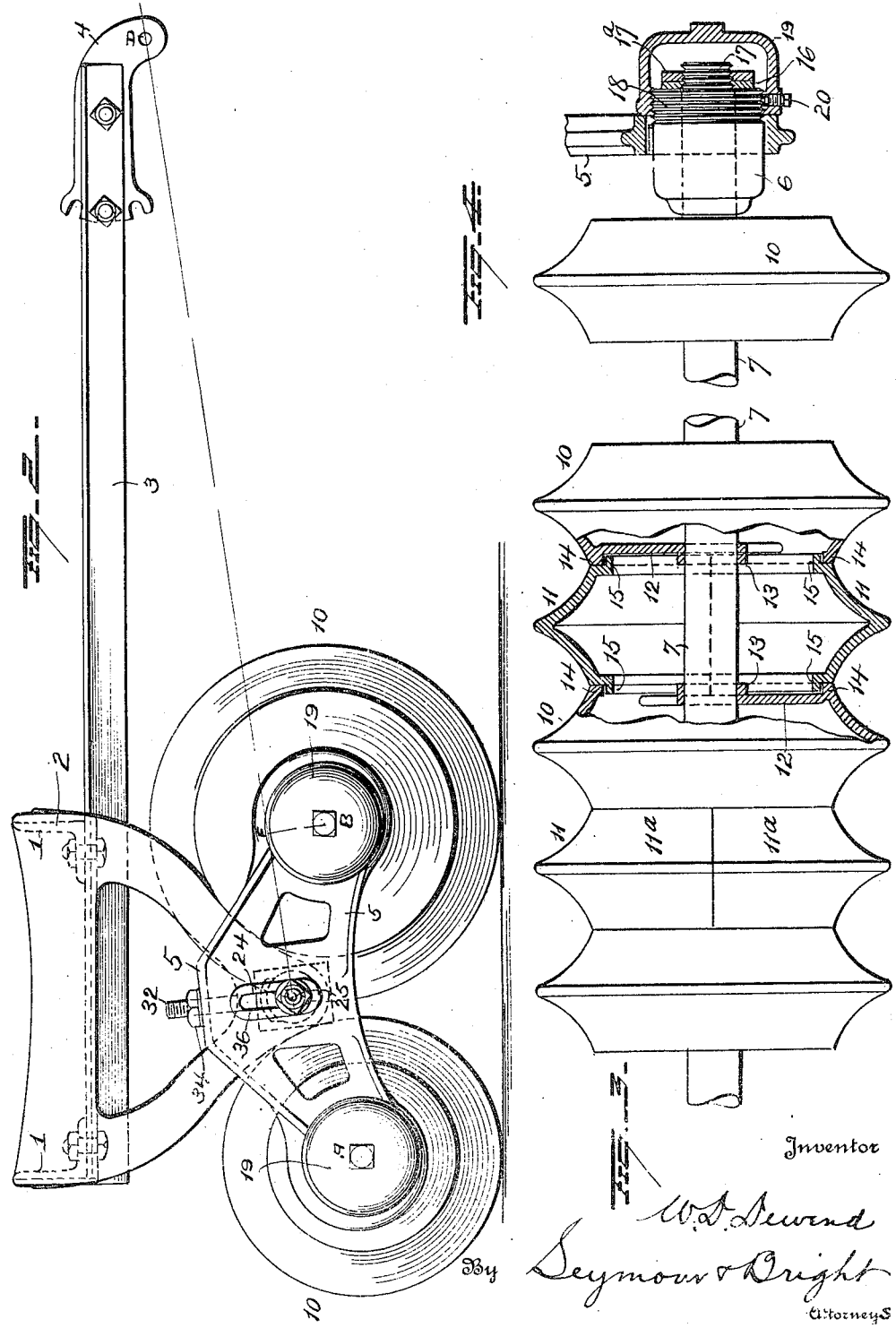

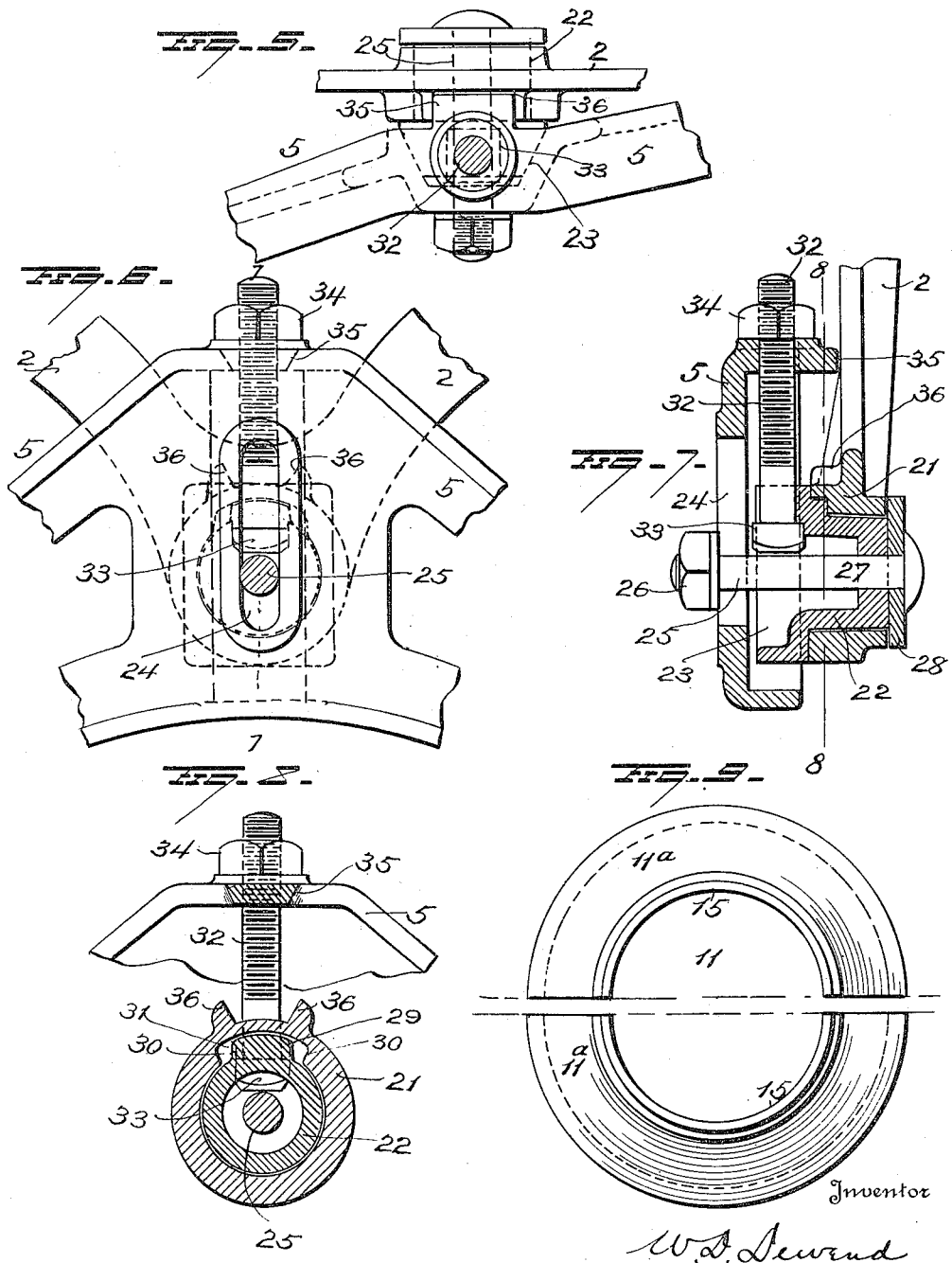

WILLIAM D. DEWEND, OF SOUTH BEND, INDIANA, ASSIGNOR TO OLIVER CHILLED PLOW WORKS, OF SOUTH BEND, INDIANA.

AGRICULTURAL IMPLEMENT.

1,418,780.           Specification of Letters Patent.     Patented June 6, 1922.

Application filed June 22, 1921. Serial No. 479,610.

*To all whom it may concern:*

Be it known that I, WILLIAM D. DEWEND, a citizen of the United States, and a resident of South Bend, in the county of St. Joseph and State of Indiana, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements and more particularly to pulverizers,—one object of the invention being to so construct a pulverizer comprising two rollers mounted in tandem in secondary frames connected with a main frame, that the connections between said frames may be adjusted in such manner as to vary the relative force or pressure upon the front and rear rollers in order to conform to varying soil conditions.

A further object is to so construct a pulverizer comprising a main frame and secondary pivoted frames in which latter the journals of the rollers, arranged in tandem, are mounted, and in which the draft force of the device is utilized to apply greater pressure upon the forward roller than upon the rear roller, that the pivotal connection between the main and secondary frames may be adjusted in a manner to vary the leverage imparted from the draft means and hence vary the relative pressure upon the front and rear rollers.

A further object is to so construct a pulverizer in which each roller comprises a plurality of disks mounted upon a shaft, that simple and efficient means shall be provided for mounting the shafts of the rollers in such manner that the mountings for said shafts and the disk-rollers may be readily adjusted.

A further object is to so construct a pulverizer having a roller comprising a plurality of disks mounted on a shaft, that the disks composing said roller may be readily assembled or disassembled.

With these and other objects in view, the invention consists in certain novel features of construction and combinations of parts as hereinafter set forth and pointed out in the claims.

In the accompanying drawings; Figure 1 is a plan view of a pulverizer embodying my improvements; Figure 2 is a side elevation; Figure 3 is a fragmentary view, partly in section of one of the disk rollers; Figure 4 is an enlarged view illustrating the bearing devices for the disk-roller shafts; Figures 5 and 6 are fragmentary views illustrating the adjustable, pivotal connections between the main and auxiliary frames; Figure 7 is a sectional view on the line 7—7 of Figure 6; Figure 8 is a sectional view on the line 8—8 of Fig. 7, and Figure 9 is an enlarged view showing one of the sectional disks.

The main frame of the implement comprises two parallel beams 1, 1 suitably spaced apart and connected at respective ends by depending brackets 2. Diagonal draft beams 3, 3 are securely bolted to the frame beams 1, 1, and converge forwardly to receive a suitable draft attaching member or clevis indicated at 4.

Secondary frames 5, 5 are pivotally connected (in a manner hereinafter explained) to the respective depending brackets 2 at the ends of the main frame. Bearing boxes 6, 6, are suitably supported near respective ends of each secondary frame for the accommodation of shafts 7 of rollers 8, 9,—each of the latter comprising hollow disks 10 and 11,—the disks of the front roller 8 being larger in diameter than the disks of the rear roller 9. The disks of each roller are made hollow and provided with peripheral earth-engaging portions which are tapering or approximately V-shaped in cross section. The disks 10 of each roller are provided with web portions 12 on which hubs 13 are formed, the latter being mounted on the shaft 7 of the roller, and side edges of the disks 10 are provided with annular flanges 14. The disks 11, which alternate with the disks 10, are made each in two parts 11ª, 11ª and these parts are provided at their side edges with laterally projecting flanges 15 which, when the disks are assembled, are embraced by the annular flanges 14 of the disks 10 and thus the two-part disks 11 are supported by and between the disks 10. By constructing the disks as above explained, they can be readily assembled or disassembled. The disks of each roller and the bearing boxes are held in place on the shafts 7 by means of nuts 16 screwed on threaded shanks 17 at the ends of each of said shafts and engaging the bearing boxes 6, and the use of bolts for securing the disks together is obviated. The threads of the shanks 17 are such as to provide adjustment for variations in the width of the disks and lengths of the bearing boxes, when the nuts 16 are turned. It will be observed that by unscrewing the nut 16 at one end of one of the shafts 7, the disks may be so moved on the shaft as to free the flanges of the disks 10 from the flanges of the two-part disks 11 so that the latter may be readily removed. The nuts 16 may be held in the positions to which they may be adjusted, by means of jam nuts 17ª. The bearing boxes 6 are threaded as shown at 18, and these portions are engaged by internally threaded caps 19 which bear against the secondary frames 5. These caps not only enclose the outer ends of the bearing boxes and threaded ends of the shafts and the nuts thereon, but they also afford means of adjustment to provide for variations between the length of the shaft and disk assembles and the distance between the secondary frames. It will also be seen that by turning the threaded caps 19, at the ends of one of the rollers, the assembly may be so adjusted that the disks thereof may be made to bear proper alternate relation to the disks of the other roller. To hold the parts in proper adjustment, the caps 19 may be secured to the bearing boxes 6 by means of set screws 20.

For pivotally and adjustably connecting the secondary frames with the main frame, the instrumentalities now to be described, may be employed.

The lower end of each depending bracket 2 is made with an enlargement 21 in which a bearing is formed for one end portion of a pivot block 22, the other end portion being made somewhat tapering as indicated at 23 and mounted in a similarly-shaped recess in the secondary frame 5. Each secondary frame 5 is provided with a vertical, elongated slot 24, through which a bolt 25 passes, said bolt also passing through the pivot block 22. One end portion of the bolt 25 is threaded to receive a nut 26 to bear against the secondary frame 5, and the other end of said bolt is provided with a head 27, between which latter and one end of the bearing block 22, a washer 28 may be disposed. That portion of the bearing block which is mounted in the main frame bracket 2, projects slightly beyond its bearing, so that when the nut 26 is tightened, the bearing block will be firmly clamped to the secondary frame but may turn freely in its mounting in the main frame bracket. The secondary frames 5 are thus rendered capable of free pivotal movement relative to the main frame brackets, and such movement may be limited by the cooperation of a lug 29 on each pivot block 22 with shoulders 30 formed by the ends of a recess 31 in the enlarged portions 21 of the adjacent bracket 2, in which recess, said lug 29 is movable. To effect adjustment of the pivotal connection between the secondary frames and the main frame, I may employ a bolt 32 having a head 33 at one end connected with the pivot block 22 and having its threaded portion passing freely through a hole at the top member of the secondary frame,—a nut 34 being located on the projected portion of said bolt and bearing on the frame.

It will be apparent from the construction above described, that by loosening the nuts 26 on the transverse bolts 25, and then turning the nuts 34 on the bolts 32, adjustment of the pivotal connection between the secondary and main frames may be quickly effected, and that by then tightening the nuts 26, such pivotal connection may be retained at any desired adjustment. When the relative adjustment between the secondary and main frames is such that the bolts 25 will occupy positions at the upper ends of the slots 24, lugs 35 on the secondary frames will occupy positions between pairs of lugs 36 on the main frame brackets, and the secondary frames will then be prevented from having pivotal movements.

It will be evident that in the operation of my improved pulverizer, when force is applied in the direction of the line C—D (Fig. 2), a lever action will be set up, causing an upward lifting at A and a downward pressure at B, and that this force will vary as the length of the lever arm varies,—said lever arm being indicated by a line B—F drawn through the center of the axis of the front disk roller and perpendicular to the direction of applied force indicated by the line C—D. By raising or lowering the points of oscillation between the main and secondary frames, the length of the lever arm B—F may be varied, and thus the relative pressures upon the front and rear disk rollers may be varied.

I do not in this case claim the particular construction of the roller, the same being covered by divisional application filed by me on the 13th day of February 1922.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In an implement of the character described, the combination with a main frame, secondary frames, and pulverizing rollers mounted in the secondary frames, of means for effecting adjustable pivotal connections between the main frame and said secondary frames.

2. In an implement of the character described, the combination with a main frame having depending brackets, of secondary frames having adjustable pivotal connections with the main frame brackets, and pulverizing rollers mounted in said secondary frames in front and in rear respectively of the adjustable pivotal connections between said secondary frames and the main frame brackets.

3. In an implement of the character described, the combination with a main frame, of secondary frames each having adjustable pivotal connection between its ends with the main frame, disk rollers having mountings in the end portions of said secondary frames and draft beams secured to the main frame and extending forwardly therefrom.

4. In an implement of the character described, the combination with a main frame provided with depending brackets, secondary frames, and pulverizing rollers mounted in respective end portions of the respective secondary frames, of a pivot member pivotally mounted in each main frame bracket, and means for adjustably securing said pivot members to intermediate portions of the secondary frames.

5. In an implement of the character described, the combination of a main frame having depending brackets, secondary frames having elongated slots between their ends, pulverizing rollers mounted in said secondary frames, pivot members mounted freely in the main frame brackets, and bolts passing through the pivot members and through the elongated slots of the secondary frames for adjustably clamping said pivot blocks to the secondary frames.

6. In an implement of the character described, the combination of a main frame having depending brackets, secondary frames having elongated slots between their ends, pulverizing rollers mounted in said secondary frames, pivot members mounted freely in the main frame brackets, bolts passing through the pivot members and through the elongated slots of the secondary frames for adjustably clamping said pivot blocks to the secondary frames, and means for limiting the pivotal movements of the secondary frames.

7. In an implement of the character described, the combination of a main frame having depending brackets, secondary frames having elongated slots between their ends, pulverizing rollers mounted in said secondary frames, pivot members mounted freely in the main frame brackets, bolts passing through the pivot members and through the elongated slots of the secondary frames for adjustably clamping said pivot blocks to the secondary frames, and means for locking said secondary frames against pivotal movement when said bolts are at the upper ends of the slots in the secondary frames.

8. In an implement of the character described, the combination of a main frame having depending brackets, secondary frames having elongated slots between their ends, pulverizing rollers mounted in said secondary frames, pivot members mounted freely in the main frame brackets, bolts passing through the pivot members and through the elongated slots of the secondary frames for adjustably clamping said pivot blocks to the secondary frames, spaced shoulders on the main frame brackets, and lugs on the secondary frames to enter between said spaced shoulders when said bolts are at the upper ends of the slots in the secondary frames.

9. In an implement of the character described, the combination of a main frame having depending brackets, secondary frames having elongated slots between their ends, pulverizing rollers mounted in said secondary frames, pivot members mounted freely in the main frame brackets, bolts passing through the pivot members and through the elongated slots of the secondary frames for adjustably clamping said pivot blocks to the secondary frames, bolts engaging the pivot members and passing through holes in the secondary frames, and nuts threaded on said last-mentioned bolts and engaging said secondary frames.

10. In an implement of the character described, the combination with frames, of a pulverizing roller comprising a shaft and a plurality of disks thereon, bearing boxes for said shaft mounted in said frames and means cooperable with said shaft for compensating for irregularities in the thickness of the disks and the length of the bearing boxes.

11. In an implement of the character described, the combination with frames, of a pulverizing roller comprising a shaft and a plurality of disks thereon, of bearing boxes for said shaft mounted in said frames, and means cooperable with said bearing boxes and frames for effecting longitudinal adjustment of the roller.

12. In an implement of the character described, the combination with frames, of a pulverizing roller comprising a shaft and a plurality of disks thereon, bearing boxes for said shaft mounted in said frame, threaded shanks on said shaft, and nuts on said shanks and engaging the bearing boxes.

13. In an implement of the character described, the combination with frames, of a pulverizing roller comprising a shaft and a plurality of disks thereon, bearing boxes for said shafts mounted in said frames, said boxes having external threaded portions and caps to screw on said bearing boxes and engage said frames to effect adjustment of said roller.

14. In an implement of the character described, the combination with frames, of a pulverizing roller comprising a shaft and a plurality of disks thereon, of bearing boxes for said shaft mounted in said frames, and caps adjustable on said bearing boxes and adapted to engage said frames to effect adjustment of the roller.

In testimony whereof, I have signed this specification in the presence of two subscribing witnesses.

WILLIAM D. DEWEND.

Witnesses:
MARJORIE E. CULVER,
JENNIE M. DAVIS.